INVENTOR:
ERIK LENNART SKOGSBERG

BY
Richardson, David and Nordon
ATTORNEYS.

INVENTOR:
ERIK LENNART SKOGSBERG

BY
Richardson, David and Nordon
ATTORNEYS.

April 2, 1957 | E. L. SKOGSBERG | 2,787,658

TELEPHONE SYSTEMS

Filed March 9, 1951 | 4 Sheets-Sheet 3

INVENTOR:
ERIK LENNART SKOGSBERG

BY Richardson, David and Nordon
ATTORNEYS.

INVENTOR:
ERIK LENNART SKOGSBERG

BY
Richardson, David and Nordon
ATTORNEYS.

2,787,658

TELEPHONE SYSTEMS

Erik Lennart Skogsberg, Stuvsta, Sweden

Application March 9, 1951, Serial No. 214,717

Claims priority, application Sweden March 10, 1950

11 Claims. (Cl. 179—5)

The present invention relates to telephone systems, preferably of the type having lines with two leads and being balanced relative to earth, in which a high degree of dependability is required, e. g. fire alarm telephone systems.

In telephone systems hitherto known of the above-mentioned kind it has not been possible to maintain the communication in the case of one lead being broken or when there is a shortcircuit across the loop.

The main object of the present invention is to provide for facilities making it possible to use a line, which is defective in either of the respects mentioned above. The invention is foremost characterized by the fact, that means are provided for normally forming a communication loop through the two line leads in a conventional manner and for switching over said loop to extend the talking circuit through one or both of the line leads in series with a ground return circuit in the case of a line fault.

According to a preferred embodiment of the invention when applied to systems provided with supervisory current control means responsive to changes in the conditions of the line circuit, connecting means of the subset or subsets and/or of the telephone exchange are operable by said rest current control means so as to automatically effect a switching over to a ground return circuit in the case of a line fault.

The invention will be better understood in connection with the accompanying drawings, in which.

Figure 1:
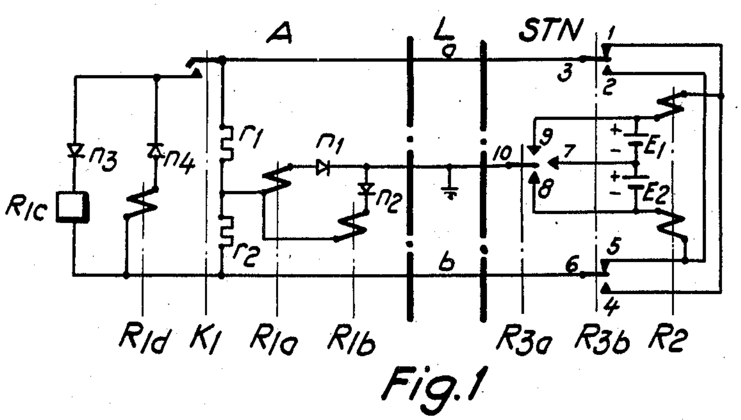
Fig. 1 shows a telephone circuit with means for the forming of different current paths, which may be utilized for the purpose of the invention.

The subset A in Fig. 1 comprises four indicating or receiving members $R_{1a}$, $R_{1b}$, $R_{1c}$ and $R_{1d}$, which are connected in series with rectifiers $n_1$–$n_4$ respectively. $R_{1c}$ and $R_{1d}$ may for instance be talking devices or the like. $R_{1a}$ and $R_{1b}$ are switching members operable by signal currents flowing between ground and the line conductors so as to effect desired switching functions, for instance switching over a talking device from a connection across the line branches to a connection between at least one line branch and earth.

The subset A is connected with the exchange over a loop or line L comprising the wires *a* and *b*. The exchange is provided with a relay device $R_2$ for indicating a current reversal in the line conductors, and two contact devices $R_{3a}$ and $R_{3b}$ for the connecting of different signalling circuits from the batteries $E_1$ and $E_2$ to the receiving members $R_{1a}$, $R_{1b}$, $R_{1c}$ and $R_{1d}$.

In the rest, or normal condition as shown in Fig. 1 the line is supervised by a current through line L, windings of relay $R_2$ and the high-ohmic resistances $r_1$—$r_2$ from the voltage sources $E_1$ and $E_2$ connected in series. The attracting force effected by the normal supervisory current flowing through the windings of relay $R_2$ may be neutralized by a counteracting biasing winding or a biasing spring force in known manner. When contact $K_1$, for instance being the switch hook contact of a telephone apparatus, is closed, the device $R_{1c}$ is energized. On the other hand devices $R_{1a}$ and $R_{1b}$ are not energized provided that the resistances $r_1$ and $r_2$ have the same resistance value, since the movable contact 10 of the contact device $R_{3a}$ is connected to the midpoint between the voltage sources $E_1$ and $E_2$ through contact 7. As will be evident from the drawing the device $R_{1b}$ becomes energized when contact 10 is switched over to contact 9, and the device $R_{1a}$ becomes energized when contact 10 is switched over to contact 8. If the contacts 3 and 6 are switched over from 1 and 5 respectively to 2 and 4 respectively the device $R_{1d}$ becomes energized. In this manner one or two of the four devices $R_{1a}$, $R_{1b}$, $R_{1c}$ and $R_{1d}$ of the subset may be selectively operated.

The manner in which some of the circuits according to Fig. 1 may be applied to a telephone system particularly suitable for fire alarm and police communication will be described in connection with Figs. 2 and 3. The devices $R_{1b}$, $n_2$, $r_1$ and $r_2$ are the same as those shown in Fig. 1. The devices $R_{1c}$, $R_{1d}$, $n_3$, $n_4$ and $K_1$ constitute a telephone subset comprising a hook switch $K_1$, an induction coil T, a receiver H, a transmitter M, a balancing network B, a ringer $R_1$ and, finally, a special contact $K_2$, here termed a catastrophe or emergency contact. When applied for the purpose mentioned above the subset A is ordinarily enclosed in a suitable casing or the like, here termed a post. The subset of each post may, according to the invention, be accessible in different ways for different purposes or to different persons. Thus, for instance, policemen and firemen may have keys for the access to the subsets and the locking means may be so constructed and arranged, that no catastrophe signal is transmitted in this case, whilst at an access for instance by breaking a seal, contact $K_2$ operated so as to connect the *a*-lead to earth either directly or when the door of the casing is opened, which connection is broken by the operation of the hook switch $K_1$ when the handset is removed. In the shown embodiment the earth potential is connected to the midpoint of the windings of the ringer $R_1$. In this way the connection to earth takes place through a resistance of a predetermined value, whereby the signal can be distinguished from a line fault arising due to connection to earth of any of the line leads. In such a case ordinarily a very high or a very low leakage resistance is present.

The line L is connected to three relays in the exchange, viz. a call relay $R_{10}$, an earth fault indicating relay $R_{11}$, and a cut-off relay $R_{12}$ and besides to a jack $S_j$. Relay $R_{10}$ is, like relay $R_2$ in Fig. 1, adapted to operate when the line is broken as well as when a call is made, that is when the resistance between the line leads is either increased or decreased. Relay $R_{11}$ having two balanced windings normally counteracting each other is in a manner known per se arranged to be operated by the connection of earth potential to the line leads, i. e. in the case of a catastrophe call or a line fault involving connection to earth of any of the line leads. Any desired indication and signalling may be effected by means of contacts of relays $R_{10}$ and $R_{11}$.

Figure 3:
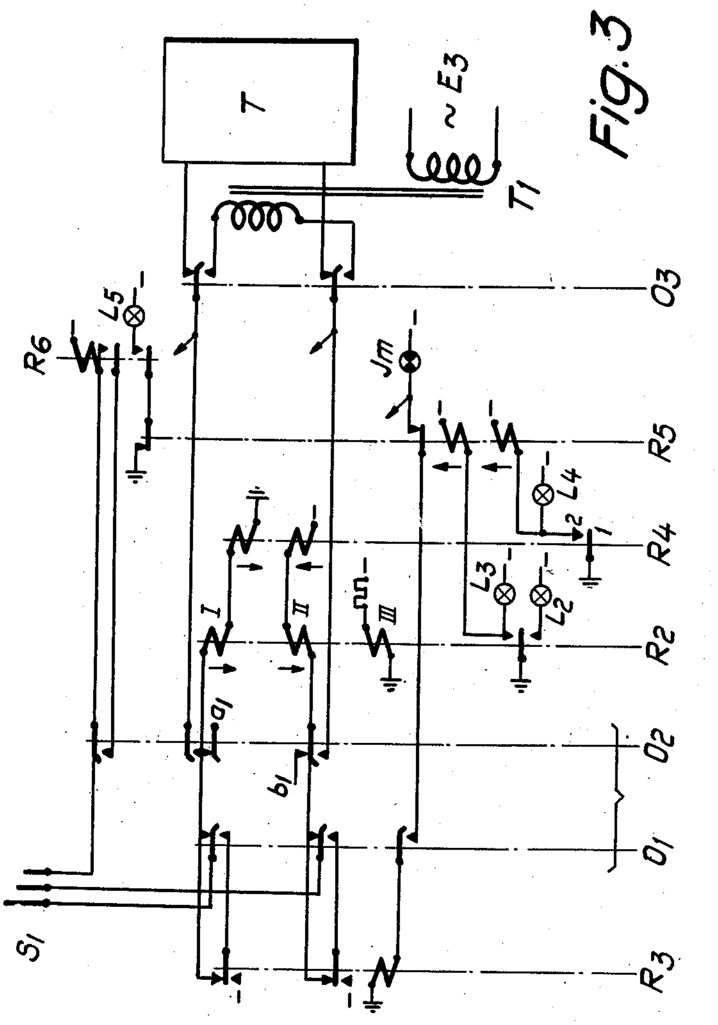
Fig. 3 is a circuit diagram in a simplified form of a cord circuit in an exchange intended to cooperate with the arrangement according to Fig. 2.
Figure 4:
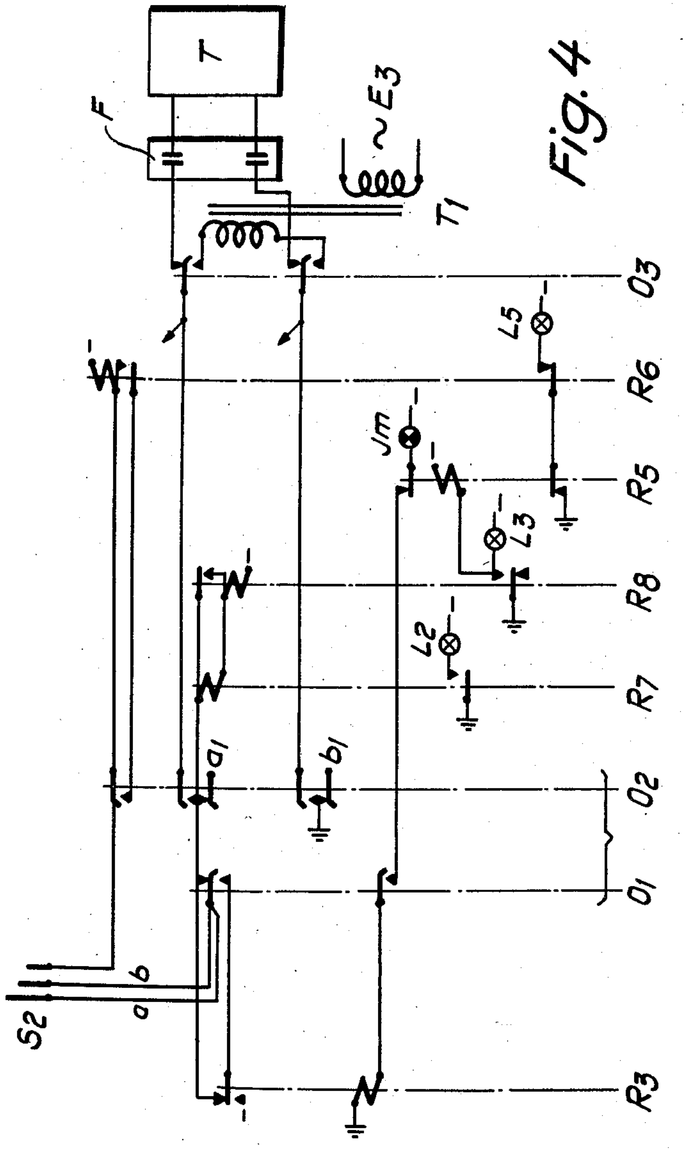
Fig. 4 is a circuit diagram in a simplified form of another cord circuit in a telephone exchange intended to cooperate with the arrangement according to Fig. 2.

The switchboard is equipped with two different kinds of answering cords equipped with suitable plugs, one of which, $S_1$ according to Fig. 3, is used in the case, that the lines are perfect or a line fault is present requiring that one of the line leads be connected to earth, and the other of which, $S_2$ according to Fig. 4, is used in the case, that one of the line leads is broken or there is a short-circuit between the line leads.

Only such parts of the switchboard according to Figs. 3 and 4 are shown as are pertinent to the invention. Other devices commonly used in switchboards such as splitting keys, ringing cords etc. are not shown in the drawings. The operator's set T including receiver, transmitter and induction coil is not shown in detail, since it may be arranged in any known way, for instance as shown in Fig. 2. In Fig. 3 only a line relay $R_2$, a flash relay $R_3$, and earth relay $R_4$, a transformer $T_1$ supplying signaling current to the line from the source $E_3$ when the switch $O_3$ is operated, and an operator's key $O_1$—$O_2$ having the talking position $O_2$ and flashing position $O_1$, a holding relay $R_6$ and a number of signal lamps $L_2$—$L_5$. Relay $R_2$ corresponds to relay $R_2$ of Fig. 1 and is in the embodiment according to Fig. 3 provided with a third winding $I_{II}$ counteracting the two windings I and II and neutralizing the effect of the supervisory current on the relay under normal conditions.

Figure 2:
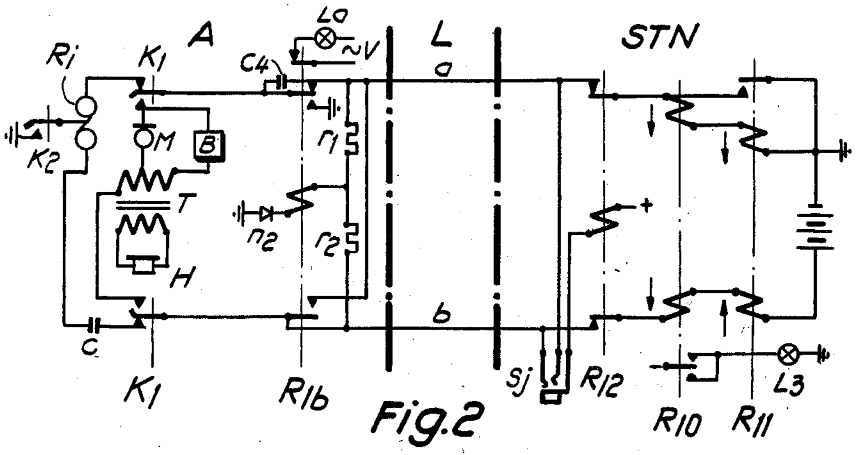
Fig. 2 shows circuit arrangements of a subset and its individual switching members in a telephone exchange according to an embodiment of the invention.

When the handset is removed and the hook switch $K_1$ is operated in the post according to Fig. 2, the current flow through the line loop is materially increased, whereby relay $R_2$ is operated and indicates the call, for instance by closing the circuit of a lamp $L_3$. At the answering of the call the answering plug $S_1$ is put into the jack $S_j$ and switch $O_2$ is operated. Holding relay $R_6$ and cut-off relay $R_{12}$ are energized in series. Relay $R_{10}$ is disconnected and relay $R_2$, which is connected to the line, is energized and closes the circuit of lamp $L_3$ and operates relay $R_5$. The operator's set T is connected to the line by means of the switch $O_2$. If the call is to be transferred by means of a ringing cord connected to contacts $a_1$, $b_1$ of switch $O_2$ the operator acts in a conventional manner (not illustrated in the drawing). When the conversation is finished and the handset of post A is replaced, the current flow through the line loop is decreased to its original value, whereby relay $R_2$ and then also relay $R_5$ is restored to normal, which causes lamp $L_3$ to be extinguished and clearing lamp $L_5$ to be lit. When, after that, the plug $S_1$ is removed from the jack $S_j$ also relay RG is deenergized, so that lamp $L_5$ is extinguished, and at the same time relay cut-off $R_{12}$ is reset, all switching members thus being restored to normal.

At a catastrophe call from the post A contact $K_2$ is operated in the manner described above. Relay $R_{10}$ as well as a catastrophe signal are received. In order that relay $R_{11}$ shall remain operated, when switch $K_1$ of the post then is operated and the connection to earth is removed, the relay is provided with a make contact short-circuiting one winding and thus keeping the relay operated. When the answering plug is put into the jack and relay $R_{12}$ is operated as described above relays $R_{10}$ and $R_{11}$ are disconnected and reset. The call is then dealt with in the same way as an ordinary call as described above.

If a patrolling policeman is to be called, for instance at the post A, the cord is connected to the respective jack and the switch $O_1$ is operated. Thereby relay $R_3$ is operated by current interrupter or impulses from an impulse sender $I_m$ and both of the line leads are then connected to negative potential through contacts of relay $R_3$. Since the positive pole of the battery normally is connected to earth relay $R_{1b}$ in the post becomes intermittently energized. A contact controlling the lamp $L_a$ is then operated in accordance with the impulses. If a policeman notices the call and answers by removing the handset of the post, relay $R_2$ is operated by current through a break contact of $R_3$ at an instant when the latter is in non-operated position. Then also relay $R_5$ is operated and opens the circuit of the impulse sender $I_m$, whereby the flashing of lamp $L_a$ ceases. Speech connection with the policeman is obtained by operating switch $O_2$ in the described manner.

When a signal is transmitted to the ringer or alarm $R_1$ of the post A, the switch $O_3$ is operated after the cord having been connected and switch $O_2$ operated. Ringing current from current source $E_3$ is then transmitted via transformer $T_1$ through the line leads to the alarm $R_1$. Since the line winding of transformer $T_1$ is not connected to earth, relay $R_{1a}$ of the post is not operated. In the case, that one lead of the line shows leakage to earth, the current, however, may also pass through the winding of relay $R_{1a}$, but this may be prevented by connecting the positive pole of a special voltage source through make contacts of switch $O_3$ to the secondary winding of transformer $T_1$, for instance to a mid-point, which voltage source has its negative pole temporarily grounded through switch $O_3$. In the case of leakage to earth of the b-lead relays $R_{10}$ and $R_{11}$ will first be operated, and upon answer, then also cord circuit relays $R_2$ and $R_4$. In this way a call cannot be indicated, but the fault can be detected by means of any known testing circuit, connected to the line by test-jacks (not shown). In the same way a short-circuit between the line leads may be detected. If one of the line leads is broken, this will be indicated by $R_2$ or $R_{10}$ in the above described manner. In the case of leakage to earth at one of the line leads speech connection may be obtained if relay $R_4$ belonging to a number of special answering cords is connected to an undergrounded voltage source. The same special voltage source may be used for this purpose as is connected to the secondary winding of transformer $T_1$ at the operation of switch $O_2$.

In the case of the line leads being short-circuited or one of them being broken speech connection is effected by means of a number of answering cords equipped with plugs $S_2$ as shown in Fig. 4. As will appear from this figure the *a*- and *b*-leads are interconnected, and two relays, $R_7$ and $R_8$, are connected in series between the leads and earth. Relay $R_7$ shall be sensitive enough to be operated in series with the winding of relay $R_{1b}$ and either of the resistances $r_1$ or $r_2$ shown in Fig. 2, which relay interconnects the line leads at the post through a capacitor $C_4$ so as to form a speech connection between the line leads on one hand and earth on the other hand, in the event that either one of the line leads is broken or they are short-circuited. When the subset of the post is removed the current flow through relays $R_7$ and $R_8$ is increased, so that also marginal relay $R_8$ is operated, which in turn short-circuits the winding of relay $R_7$, whereby a sufficient current strength for feeding the microphone is obtained. By the operation of relay $R_8$ lamp $L_3$ is lit, and when the handset is replaced, disconnect lamp $L_5$ is lit in the same way as described in connection with Fig. 3. A call by means of lamp $L_a$ of Fig. 2 is also obtainable in case of a shortcircuiting or a break by operating switch $O_1$, whereby relay $R_3$ is caused to operate intermittently in the same way as described in connection with Fig. 3.

Figure 5:
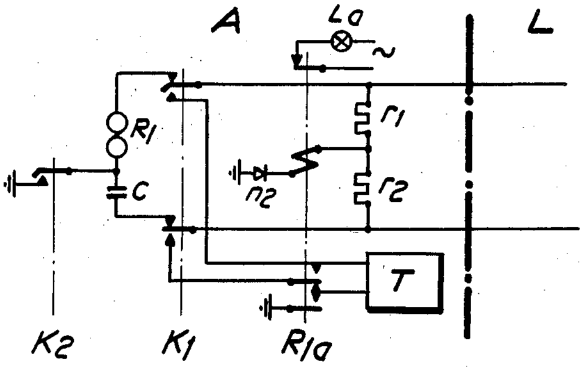
Fig. 5 shows another embodiment of the invention in which the post has been somewhat modified.

In the embodiment according to Fig. 5 the post has been somewhat modified. The contacts of relay $R_{1a}$ are in this embodiment so connected, that only the talking device T of the subset is disconnected from across the line leads to between the two line leads in multiple on one hand and earth on the other hand. The device will operate quite in the same way as described in connection with Fig. 4, when reference is made to this figure.

When the communication circuit extends through earth there will be some noise which, however, may be materially reduced or even eliminated according to the invention by the use of a band-pass filter F connected as shown in Fig. 4, which filter suppresses frequencies below and above the speech frequency range, for instance below 300 c./s. and above 2500 c./s. A filter for a similar purpose may also be provided in the post A and consists simplest form of a condenser $C_4$ according to Fig. 2. When a single condenser is used of course only the high frequencies are blocked, but as the noise mainly consists of high frequencies this filtering is ordinarily quite sufficient.

In the embodiments described above the talking circuit is switched over at the subset by means of a relay and the choice of normal or emergency talking circuit is determined by the choice between two different kinds of cords at the exchange or superior station. It is possible, however, to use instead or in combination static blocking members such as rectifier elements at the substation or substations for forming the circuits as determined by the respective switching members of the exchange or superior station, and in case the latter is provided with supervisory current control means, the switching over may be effected by such supervisory current control means.

Figure 6:
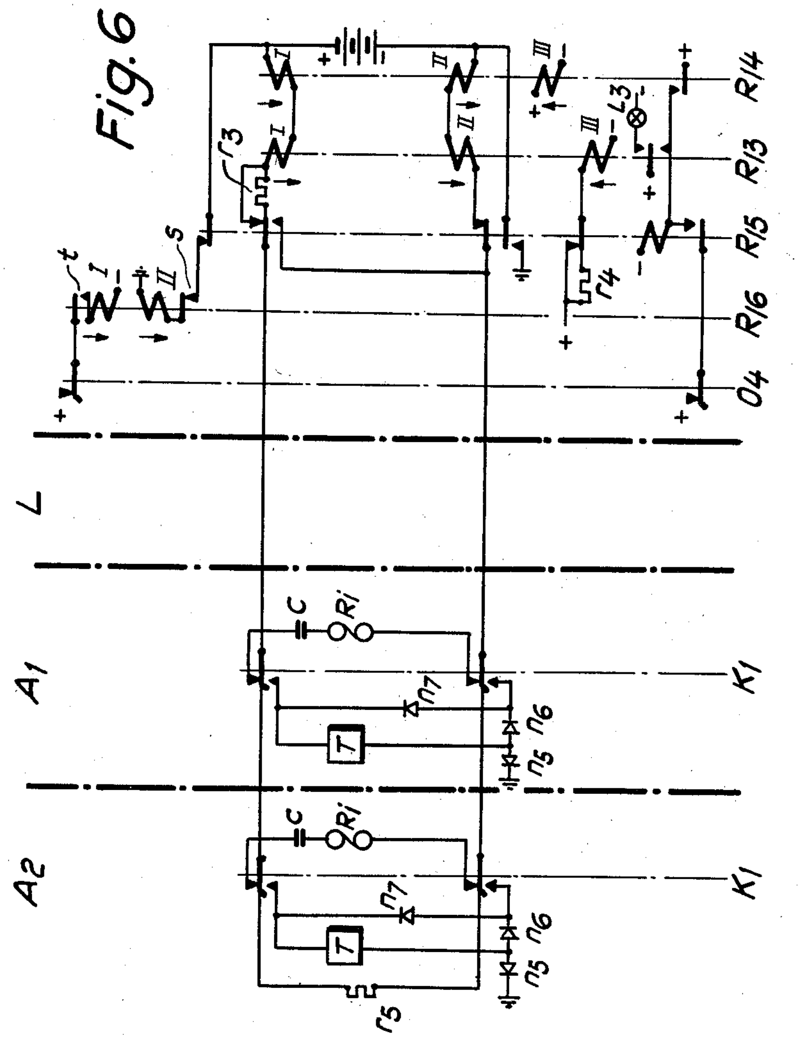
Fig. 6 shows another embodiment in which static blocking members such as rectifier elements are used at the substation or substations for forming the circuits as determined by the respective switching members of the exchange or superior station.

An embodiment of the invention in which those two modifications are combined is shown in Fig. 6.

In Fig. 6 two substations $A_1$, $A_2$ connected to one and the same line are shown. Each subset contains in addition to the talking device T, alarm $R_1$, switch hook $K_1$, and condenser C already described three rectifier valves $n_5$, $n_6$ and $n_7$. Rectifier valve $n_5$ connects in its forward direction one terminal of talking device T to earth, rectifier valve $n_6$ connects in its forward direction the same terminal of talking device T to the lower line lead in operated position of switch hook $K_1$, and rectifier valve $n_7$ connects in its forward direction the lower line lead with the other terminal of talking device in operated position of switch hook $K_1$.

Resistance $r_5$ terminates the line and is determinative of the supervisory current. From point of principle it will be seen that the talking device T in this way properly receives current in the different cases. When the line is perfect the upper line lead is presumed to be positive and the lower negative. Valve $n_7$ does not shunt the talking device T, since the voltage is directed in its blocking direction, valve $n_6$ passes the current to the lower line lead and valve $n_5$ blocks provided the positive pole of the exchange battery is connected to earth, which is presumed. In the case of a break of the upper line lead the negative pole of the central battery in the exchange is earthed and a positive potential will be transmitted through the lower line lead, contact of switch hook $K_1$, valve $n_7$, talking device T, rectifier $n_5$ and earth to the negative pole of the central battery. In this case valve $n_6$ is blocking.

If the lower line lead is broken the negative pole of the central battery is likewise connected to earth and both the line leads are connected to the positive pole.

As will be seen from the drawing talking device T then will receive current from the upper line lead, the circuit extending through rectifier $n_5$ and earth.

The switching operations necessary for the connections generally indicated above are carried out by relay $R_{15}$ in cooperation with relays $R_{13}$, $R_{14}$ and $R_{16}$, all situated in the exchange and either being individual to each line or forming part of the equipment of an intermediary connecting line connectable to the line by a line finder, selector or other switching means.

Relays $R_{13}$, $R_{14}$ operate in essentially the same manner as relays $R_{10}$ and $R_{11}$ of Fig. 2. Thus relay $R_{13}$ is operated by a call and in the case one line lead is broken, whilst relay $R_{14}$ is operated if the line is shortcircuited. Relay $R_{16}$ has one of its two windings connected on one hand to the positive pole of the battery and on the other hand to earth, and is operated at predetermined minimum leakage to earth of the line. If either of relays $R_{13}$ or $R_{14}$ is operated relay $R_{15}$ is energized through contacts of these relays and the line leads are interconnected. Further the negative pole of the battery is connected to earth and relay $R_{16}$ operates and disconnects the earth through its winding from the battery. In this way all the necessary functions mentioned above are automatically obtained. Resistance $r_4$ which is connected in series with the biasing winding III of relay $R_{13}$ at the operation of relay $R_{15}$ is matched so as to cause this relay to be reset, and after that be duly operated by calls transmitted over the circuit through earth.

Resistance $r_3$ has about the same value as the windings II of relays $R_{13}$ and $R_{14}$ together in order that the microphone current shall be limited to its proper value upon the switching over.

Relays $R_{15}$ and $R_{16}$ are kept in operated position through contacts of a switch $O_4$, and when the fault is cleared the device is restored to normal operation by this switch.

Of course, the invention may be varied and modified in many respects without departing from the inventive idea. Thus for instance in the embodiments according to Figs. 3 and 4, the switching over of the cord leads and equipment may be effected by switching members, so that the same cords may be used in all cases. How this can be done is evident to any person skilled in the art from the shown circuits.

I claim:

1. A telephone system of the class described, comprising: a telephone exchange including a telephone set; a subset including a telephone set; a two conductor metallic line and a ground circuit interconnecting said subset and said exchange for communication therebetween; switching means at said exchange for establishing a talking connection between said telephone sets, said switching means comprising means for establishing said talking connection either over said two conductor line or over at least one of said conductors and said ground circuit; a relay in said subset, said relay having an operating winding connected to an energizing circuit including at least one of said conductors, and having contacts controlled by said operating winding for connecting said telephone set of said subset in one position of said contacts for communication over said two line conductors and in another position of said contacts for communication over said two line conductors connected in multiple and said ground circuit and further switching means at said central office for selectively controlling said relay energizing circuit.

2. A telephone system according to claim 1, further comprising two serially connected resistors of substantially equal resistances having a junction therebetween, said resistors being connected across said two conductor line, and wherein said energizing circuit of said relay includes said junction between said resistors and said ground circuit.

3. A telephone system according to claim 1, further comprising a rectifier at said subset, said rectifier being included in said energizing circuit of said relay for preventing operation of said relay when a direct current potential of predetermined polarity is applied to said energizing circuit.

4. A telephone system according to claim 3, wherein said rectifier is serially included in said energizing circuit.

5. A telephone system of the class described, comprising: a telephone exchange including a telephone set; a subset including a telephone set, said subset having normally open switch-chook contacts; a two conductor metallic line and a ground circuit interconnecting said subset and said exchange for speech communication therebetween, said connection, during communication, including said switch-chook contacts in closed position; and impedance element in said subset connected across said two line conductors; a voltage source at said exchange; and a relay at said exchange having a winding included in a normally closed energizing circuit serially including said voltage source, said metallic line and said impedance element, said relay having contacts responsive to a change in current flow in said winding; and signaling means responsive to said relay contacts; and switching means at said exchange and at said subset for selectively connecting said ground circuit for speech communication thereover.

6. A telephone system according to claim 5 wherein said relay contacts are responsive both to an increase and to a decrease in said current flow in said winding.

7. A telephone system according to claim 5, wherein said impedance element is a resistor and wherein said voltage source is a battery.

8. A telephone system according to claim 5, wherein said impedance element comprises a center tap, and in which said switching means comprises a relay in said subset, said relay having an energizing circuit including said center tap and said ground circuit and having contacts connecting said telephone set in one position of said relay contacts for communication over said two line conductors, and in another position of said relay contacts over said two line conductors connected in multiple and said ground circuit.

9. A telephone system according to claim 8, wherein said impedance element provides direct current continuity therethrough, and wherein said voltage source is a battery having one terminal thereof grounded, further comprising a rectifier in said subset serially included in the energizing circuit of said subset relay, and poled to block current flow therethrough from said battery, said exchange comprising switching means for applying a potential with respect to ground opposite to the potential of said battery to said line for operation of said subset relay.

10. A telephone system according to claim 9 wherein said impedance element is a resistor.

11. A telephone system according to claim 5, wherein said relay at said exchange has two windings, and wherein said voltage source is a battery having one terminal thereof grounded, further comprising a ground detecting relay at said exchange having two differentially connected windings, each winding being connected in series with one of the windings of said first-named relay.

References Cited in the file of this patent

UNITED STATES PATENTS

| | | |
|---|---|---|
| 1,217,548 | Adams-Randall | Feb. 27, 1917 |
| 1,240,811 | Beach | Sept. 25, 1917 |
| 1,274,514 | Cregier | Aug. 6, 1918 |
| 2,552,780 | Hadfield | May 15, 1951 |